United States Patent [19]

Takano et al.

[11] Patent Number: 4,782,934

[45] Date of Patent: Nov. 8, 1988

[54] CONTROL SYSTEM FOR A CONTINUOUSLY VARIABLE TRANSMISSION

[75] Inventors: Toshio Takano, Hamuramachi; Hiroshi Tanaka, Tokyo; Motohisa Miyawaki, Choufu, all of Japan

[73] Assignee: Fuji Jukogyo Kabushiki Kaisha, Tokyo, Japan

[21] Appl. No.: 43

[22] Filed: Jan. 2, 1987

[30] Foreign Application Priority Data

Jan. 7, 1986 [JP] Japan .................................... 61-899
Mar. 28, 1986 [JP] Japan .................................. 61-70226

[51] Int. Cl.⁴ ............................................. B60K 41/28
[52] U.S. Cl. ............................... 192/0.073; 192/0.032; 192/0.092; 192/3.56; 74/866
[58] Field of Search .............. 192/0.032, 0.052, 0.076, 192/0.092, 3.54, 3.55, 3.56, 3.58, 0.073, 0.033; 74/877, 866

[56] References Cited

U.S. PATENT DOCUMENTS

| | | | |
|---|---|---|---|
| 4,605,112 | 8/1986 | Takano | 192/3.56 |
| 4,651,595 | 3/1987 | Miyawaki | 74/866 |
| 4,679,674 | 7/1987 | Sakakiyama | 192/0.052 |
| 4,680,987 | 7/1987 | Morimoto | 74/866 |

FOREIGN PATENT DOCUMENTS

| | | |
|---|---|---|
| 55-65755 | 5/1980 | Japan . |
| 60-98257 | 6/1985 | Japan . |
| 60-139925 | 7/1985 | Japan . |

Primary Examiner—Leslie A. Braun
Assistant Examiner—David A. Testardi
Attorney, Agent, or Firm—Martin A. Farber

[57] ABSTRACT

A control system for a motor vehicle provided with a continuously variable transmission and a clutch for transmitting power of an engine to the transmission. The transmission has a transmission ratio control valve having ports and a spool for controlling the transmission ratio. A throttle position sensor is provided for detecting the load on an engine and for deciding a desired transmission ratio in accordance with the load. The clutch is automatically disengaged at low vehicle speed. When an accelerator pedal is depressed in order to re-accelerate the vehicle, the desired transmission ratio is increased to increase the speed of a drive pulley of the transmission so that the drive pulley speed equals the speed of the engine.

17 Claims, 8 Drawing Sheets

CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for transmission ratio of the transmission at low vehicle speed.

A known continuously variable belt-drive transmission for a motor vehicle (Japanese Patent Laid Open No. 55-65755) comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to servo devices, a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The output of the engine is transmitted to the drive pulley through a clutch. The line pressure is controlled to prevent the belt from slipping on the pulleys in order to transmit the output of the engine.

In such a system, when the vehicle is decelerated and vehicle speed reduces below a predetermined speed, the clutch is disengaged in order to prevent stalling of the engine. At transmission ratio is increased to increase the speed of a drive pulley of the transmission so that the drive pulley speed equals the speed of the engine transmission ratio and the vehicle speed. Thereafter, when an accelerator pedal of the vehicle is depressed in order to re-accelerate the vehicle, engine speed is increased and hence speed of a drive member of the clutch is increased. When the engine speed exceeds a predetermined speed, the clutch is engaged. However, there is a difference between the high engine speed and the low drive-pulley speed, which causes occurrence of a shock upon the engagement of the clutch.

Japanese Patent Laid Open No. 60-139925 discloses a system to smoothly engage an electromagnetic clutch at the re-acceleration of a vehicle. The system is adapted to engage the clutch when the engine speed coincides with the speed of a driven member of the clutch. However, the engagement of the clutch is performed regardless of load on the engine, that is the depression degree of the accelerator pedal. Accordingly, the shock at the engagement can not be entirely eliminated.

Japanese Patent Laid Open No. 60-98257 discloses a transmission ratio control system at re-acceleration of a vehicle. The system is arranged to increase the transmission ratio of a transmission to increase the speed of a drive pulley. When the engine speed coincides with the speed of the drive pulley, a clutch is engaged. However, there is a time delay until the clutch engages, since the clutch is engaged after the downshifting of the transmission at the re-acceleration of the vehicle.

SUMMARY OF THE INVENTION

The object of the present invention is to provide a control system which may quickly downshift a transmission so as to smoothly engage a clutch.

The other objects and features of this invention will become understood from the following description with reference to the accompanying drawings.

DETAILED DESCRIPTION OF THE PREFERRED EMBODIMENT

Figure 1:
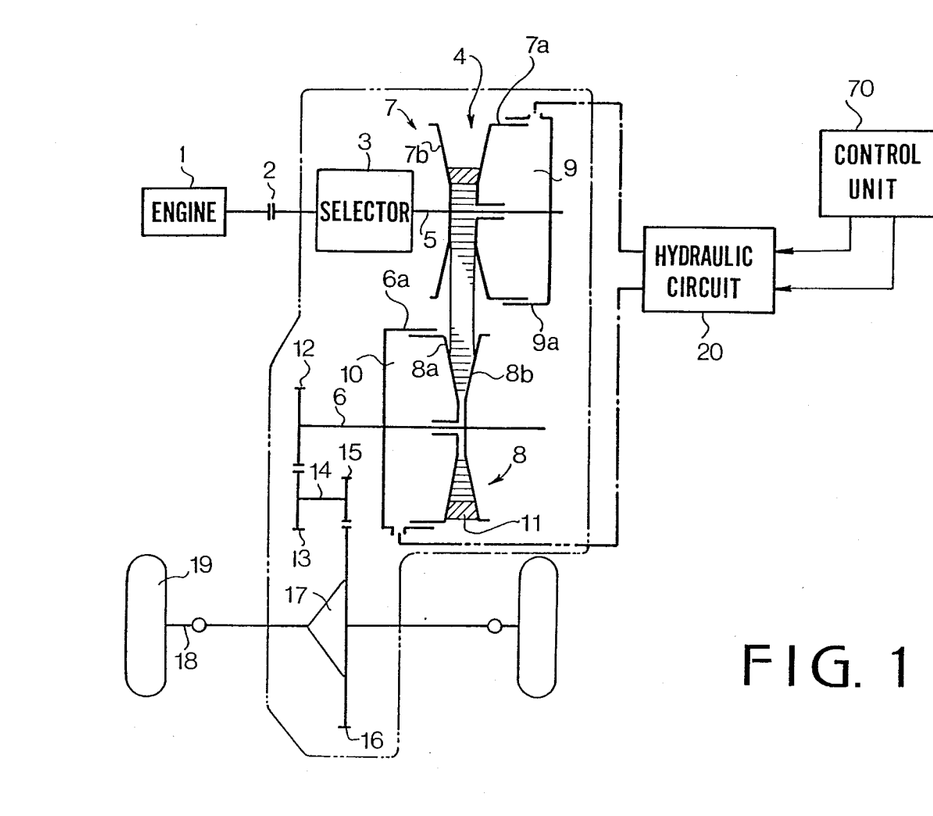
FIG. 1 is a schematic illustration of a continuously variable belt-drive transmission.

Referring to FIG. 1, a motor vehicle is provided with an engine 1, and an electromagnetic powder clutch 2 for transmitting the power of the engine to a continuously variable belt-drive transmission 4 through a selector mechanism 3. The selector mechanism 3 is arranged to select a drive range, reverse range and neutral position by manually operating a selector lever.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6, respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with hydraulic circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
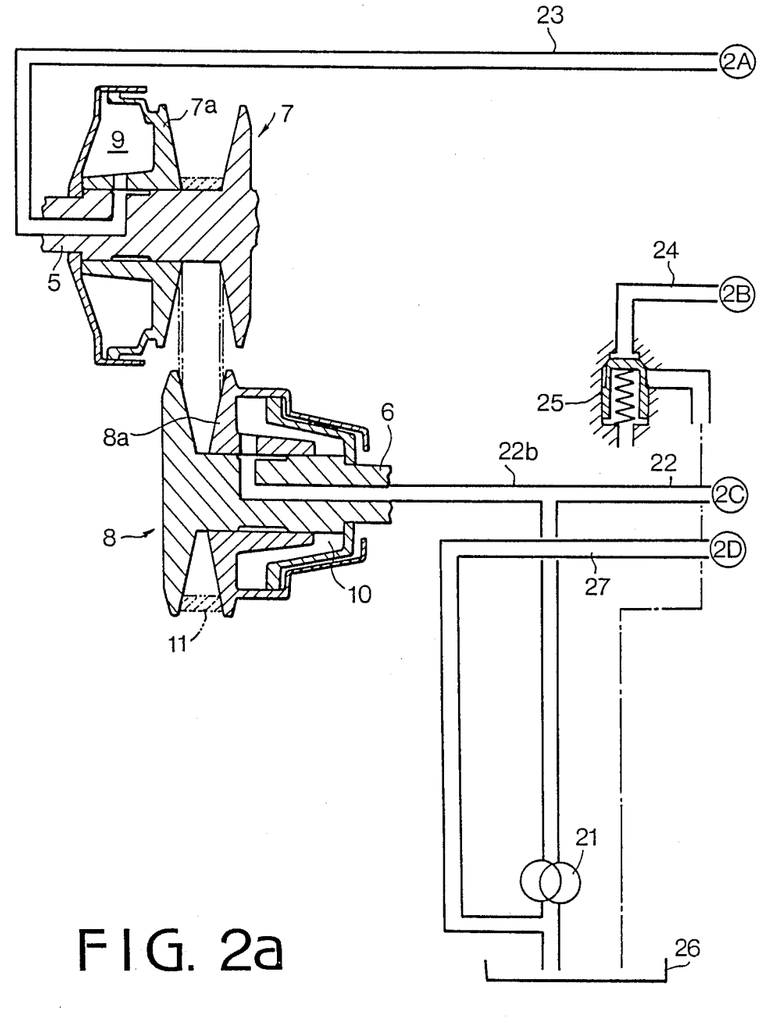
FIGS. 2a and 2b are schematic diagrams showing a control system according to the present invention.
Figure 2B:
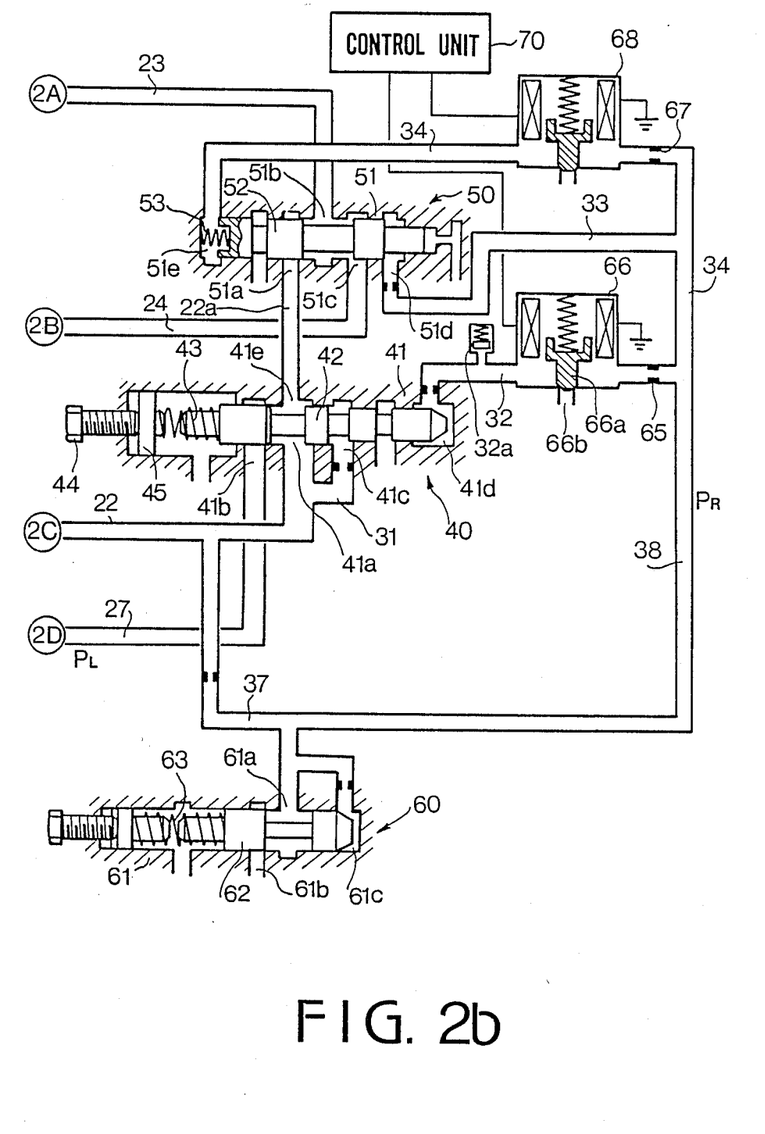

Referring to FIGS. 2a and 2b, chamber 9 of the drive pulley 7 is supplied with pressurized oil by an oil pump 21 from an oil reservoir 26, passing through a line pressure conduit 22, ports 41a and 41e of a line pressure control valve 40, ports 51a and 51b of a transmission ratio control valve 50, and conduit 23. The chamber 10 of driven pulley 8 is applied with pressurized oil through a passage 22b, without passing through valves 40 and 50. The movable conical disc 7a of the drive pulley 7 is so designated that the pressure receiving area thereof is larger than that of movable conical disc 8a of the driven pulley 8. The line pressure control valve 40 comprises a valve body 41, spool 42, and chambers 41c and 41d. The spool 42 is applied with pressure of the pressurized oil supplied through a conduit 31 to the chamber 41c. An end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, spring 53 for urging the spool 52 in the downshift direction. The port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through a conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 toward the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and a passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The control valves 66 and 68 are operated by signals from a control unit 70. Thus, oil pressure controlled by the control valves 66 and 68 is applied to chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

Figure 3:
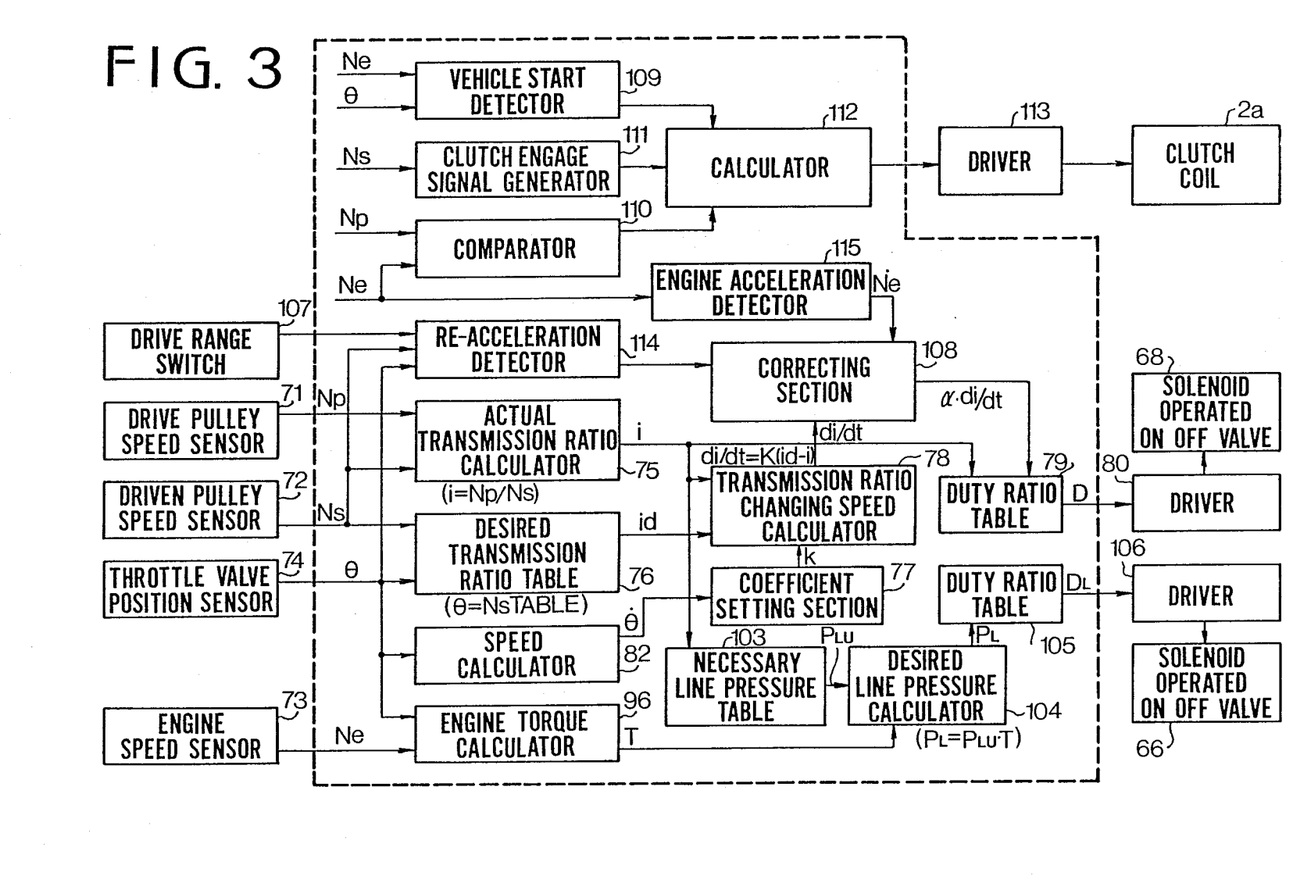
FIG. 3 is a block diagram showing a control unit.

Referring to FIG. 3, a drive pulley speed sensor 71, driven pulley speed sensor 72, engine speed sensor 73, throttle position sensor 74, and a drive range switch 107 are provided. Output signals $N_p$ and $N_s$ of sensors 71, 72 are fed to an actual transmission ratio calculator 75 to produce an actual transmission ratio i in accordance with $i = N_p/N_s$. Output signal $N_s$ and output signal $\theta$ of the throttle position sensor 74 are fed to a desired transmission ratio table 76. The desired transmission ratio id is fetched by the table 76 in accordance with the signals $N_s$ and $\theta$. On the other hand, the output signal $\theta$ is fed to a throttle valve opening speed calculator 82 to obtain throttle valve speed $\dot{\theta}$. The signal of the speed $\dot{\theta}$ supplied to a coefficient setting section 77 to produce a coefficient K. The actual transmission ratio i, desired transmission ratio id and coefficient K from the coefficient setting section 77 are applied to a transmission ratio changing speed calculator 78 to produce a transmission ratio changing speed (rate) di/dt from the formula $di/dt = K(id - i)$. The transmission ratio changing speed di/dt is corrected at a correcting section 108.

The corrected speed (rate) di/dt and the actual ratio i are applied to a duty ratio table 79 to derive the duty ratio D. The duty ratio D is supplied to the solenoid operated valve 68 through a driver 80.

Further, the output signal of throttle position sensor 74 and the output $N_e$ of engine speed sensor 73 are fed to an engine torque calculator or table 96, so that engine torque T is obtained based on throttle position $\theta$ and engine speed Ne.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated from their product.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio. The drive range switch 107 produces an output signal, when the drive range is selected.

A system for controlling the clutch 2 is described hereinafter. The output signal Ne of the engine speed sensor 73 is fed to a vehicle start detector 109 and to a comparator 110. The output signal $N_p$ of the drive pulley speed sensor 71 is supplied to the comparator 110 and output signal $N_s$ of the driven pulley speed sensor 72 is fed to a clutch engaging signal generator 111. The signal $\theta$ of the throttle position sensor 74 is applied to the vehicle start detector 109. Output signals of detector 109, comparator 110 and signal generator 111 are applied to a calculator 112. In response to the output signals, the calculator 112 produces a clutch current signal which is applied to a clutch coil 2a through a driver 113 to control the electromagnetic powder clutch 2.

In the system of the present invention, re-acceleration detector 114 is provided to generate a re-acceleration signal dependent on output signals of the drive range switch 107, driven pulley speed sensor 72 and throttle position sensor 74. The re-acceleration signal is applied to the correcting section 108. Further, an engine acceleration detector 115 is provided to receive the output signal Ne of the engine speed signal to produce an engine acceleration signal Ne (dNe/dt).

The signal Ne is fed to the correcting section 108 to correct the transmission ratio changing speed signal so as to increase the downshift speed of the spool 52 of the transmission ratio control valve 50.

In operation, while the vehicle is at a stop, chamber 10 of the driven pulley 8 is supplied with line pressure through passage 22b, and the chamber 9 of the drive pulley 7 is drained, since the $N_P$, $N_S$, $\theta$ and duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the drive belt 11 engages with the driven pulley at a maximum running diameter to provide the largest transmission ratio (low speed stage). When the accelerator pedal is depressed, the calculator 112 produces the clutch current signal. In accordance with the clutch current signal, the clutch current passing in the coil 2a increases progressively with increasing of engine speed. The electromagnetic clutch 2 is gradually engaged, transmitting the engine power to the drive pulley 7. The power of the engine is transmitted to the output shaft 6 at the largest transmission ratio by the drive belt 11 and driven pulley 8, and further transmitted to the axles 18 of the driving wheels 19. Thus, the vehicle is started.

At that time the line pressure is at the highest value by the pressure control valve 40, since the duty ratio for the valve 66 is large, and the spool 42 of the control valve 40 is at the right end position. When the vehicle speed (output signal $N_s$) exceeds a predetermined value, the clutch engaging signal generator 111 produces a signal, so that the clutch 2 is entirely engaged. When the throttle valve is opened for acceleration, the desired transmission ratio id is fetched by the desired transmission ratio table 76 and the transmission ratio changing speed di/dt is calculated by calculator 78, and duty ratio D is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23. On the other hand, the duty ratio for the control valve 66 is reduced, thereby shifting the spool 42 of the valve 40 to the left. The port 41a communicates with the port 41b of the drain passage 27. Thus, line pressure reduces, and the transmission is upshifted, since oil is still supplied to the chamber 9 through the control valve 50. The transmission ratio is reduced along an upshift line lu of FIG. 4a.

The control operation of line pressure will be described hereinafter. From the engine torque table 96, a torque T is obtained in accordance with throttle position $\theta$ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

Figure 4A:
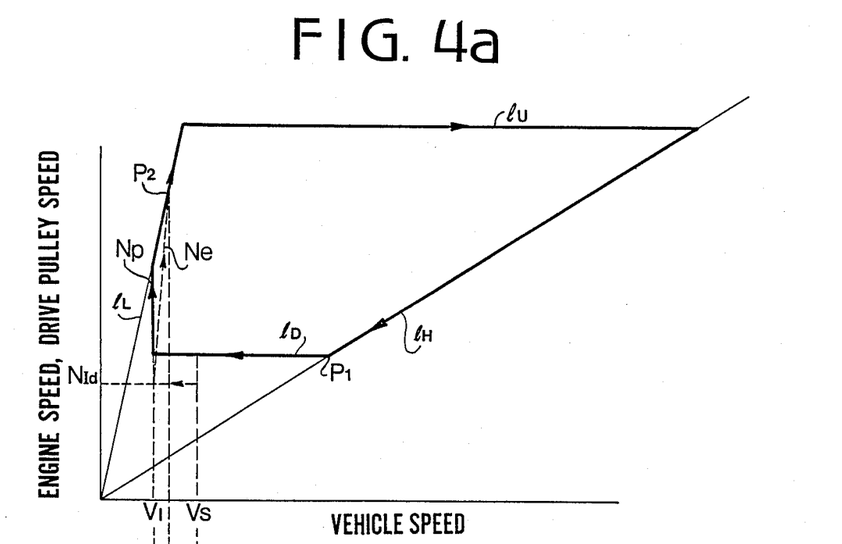
FIGS. 4a and 4b show a transmission characteristic and a clutch characteristic.
Figure 4B:
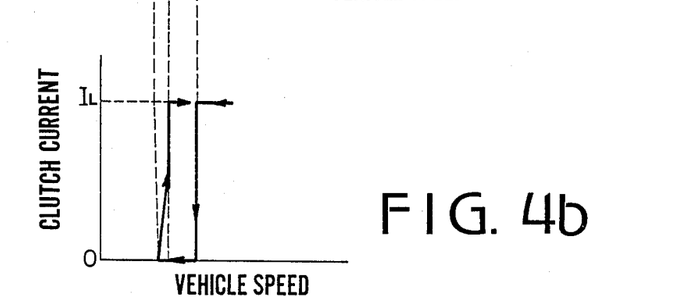

When the accelerator pedal is released and the vehicle is decelerated in a driving condition at the lowest transmission ratio, engine speed and vehicle speed reduce along an overdrive line lH of FIG. 4a. When the vehicle speed and engine speed reach a point $P_1$, the operation of the system begins to increase the transmission ratio. The transmission ratio is increased along a downshift line $l_D$. When the vehicle speed reduces below the predetermined speed $V_s$, the signal generator 111 stops generating the clutch engaging signal to cut off the clutch current (FIG. 4b). When the clutch 2 is disengaged, the engine speed reduces to idle speed NId as shown by a dashed line in FIG. 4a. On the other hand, the drive pulley speed is held at the speed of the line $l_D$.

When the accelerator pedal is depressed in order to re-accelerate the vehicle, the detector 114 produces the re-acceleration signal which is supplied to the correcting section 108. The engine acceleration detector 115 produces the engine acceleration signal $N_e$ which is applied to the correcting section 108. The correcting section operates to increase the transmission ratio changing speed di/dt by a formula $\alpha \times di/dt$ ($\alpha$ is a coefficient corresponding to the acceleration d Ne/dt). Accordingly, the transmission ratio is rapidly increased to positively increase the drive pulley speed as shown by a line ($N_P$) of FIG. 4a. On the other hand, the engine speed increases as shown by a dashed line ($N_e$) and clutch current begins to flow and increases with the increase of the engine speed as shown in FIGS. 4a and 4b. Accordingly, the clutch 2 is partially engaged, so that the vehicle speed increases to increase the drive pulley speed along a maximum transmission ratio line $l_L$. When the drive pulley speed coincides with the engine speed at a point P2, the comparator 110 produces a signal. In response to the signal, the calculator 112 produce a lock-up signal, so that the clutch 2 is locked up. Thus, the clutch can be engaged without the occurrence of engaging shock.

Figure 5:
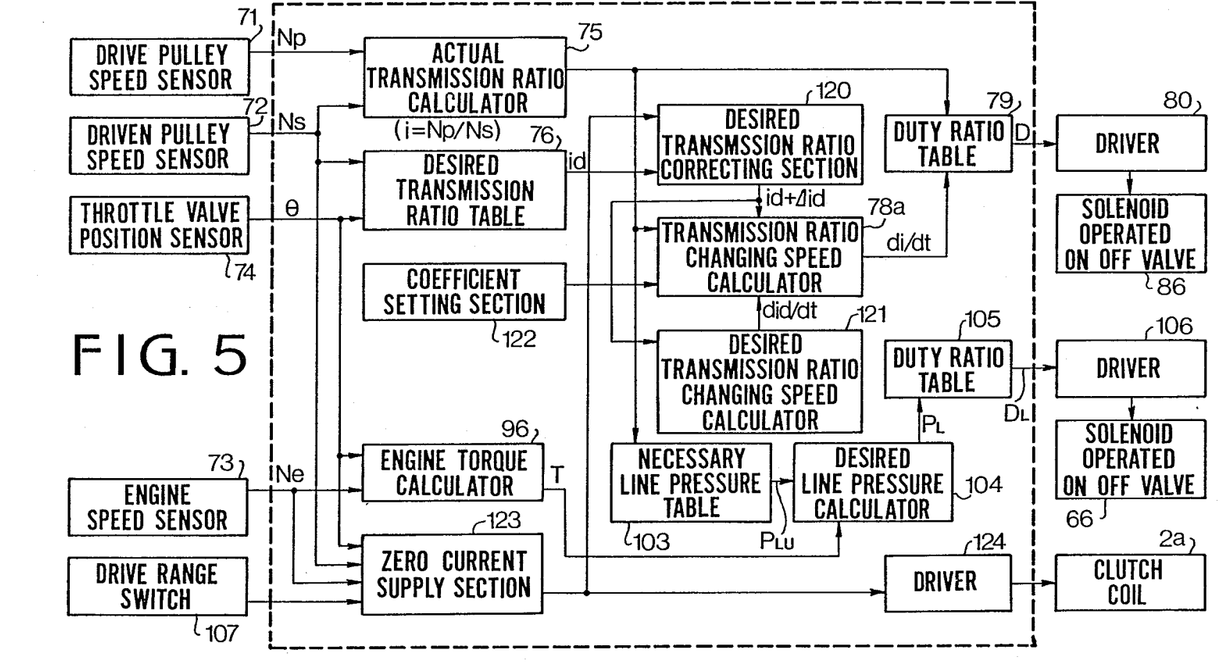
FIG. 5 is a block diagram showing another embodiment of the present invention.

Referring to FIG. 5 showing another embodiment of the invention, the same parts as the first embodiment are identified by the same references as FIG 3. The system is provided with a desired transmission ratio correcting section 120, a desired transmission ratio changing speed calculator 121, a coefficient setting section 122, and a zero current signal supply section 123 as a clutch disengagement detector. The zero current signal supply section 123 is applied with signals $N_S$, $\theta$ and Ne of driven pulley speed sensor 72, throttle position sensor 74 and engine speed sensor 73 and with the output signal of the drive range switch 107. When the clutch 2 is disengaged, the section 123 stops supplying current to the coil 2a through a driver 124, so that the clutch 2 is held in a zero mode. Further the zero current signal is supplied to the desired transmission ratio correcting section 120. The correcting section 120 corrects the desired transmission ratio id by making a calculation of a formula of (id+$\Delta$id). The corrected desired transmission ratio id+$\Delta$id is applied to the desired transmission ratio changing speed calculator 121. The coefficient setting section 122 supplies coefficients K1 and K2 to a transmission ratio changing speed calculator 78a in dependency on engine operating conditions. The transmission ratio changing speed calculator 78a calculates transmission ratio changing speed di/dt by the following equation in accordance with the actual transmission ratio i, corrected desired transmission ratio id $+\Delta$id, coefficients K11 and K2, and desired transmission ratio changing speed did/dt from the calculator 121.

$$di/dt = K_1(id-i) + K_2 \cdot did/dt$$

In the equation, the term of $K_1$ (id−i) is a deviation of the controlled output. If the manipulated variable (duty ratio) is decided on by the deviation, the control operation is delayed with a time lag of the first order caused by various elements in the system. In order to prevent such a delay, the desired did/dt transmission ratio changing speed $K_2 \cdot did/dt$ is added as a phase-lead term.

In order to facilitate the decision of the changing direction of the transmission ratio, the above equation is re-written as follows.

$$di/dt = K_1\{(id + K_2/K_1 \cdot did/dt) - i\}$$

When $(id + K_2/K_1 \cdot did/dt) > i$, that is $di/dt > 0$, the transmission is downshifted. When $(id + K_2/K_1 \cdot did/dt) > i$, that is di/dt is less than 0, the transmission is upshifted.

Figure 6A:
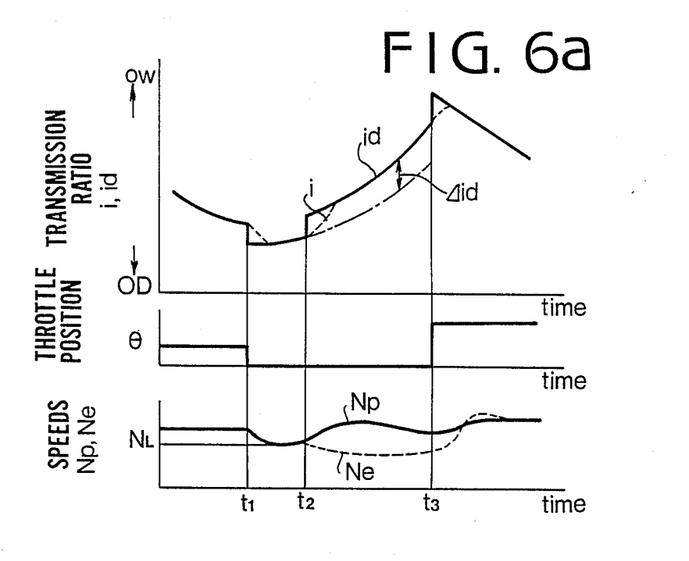
FIGS. 6a and 6b are graphs showing control operation of the system of FIG. 5.
Figure 6B:
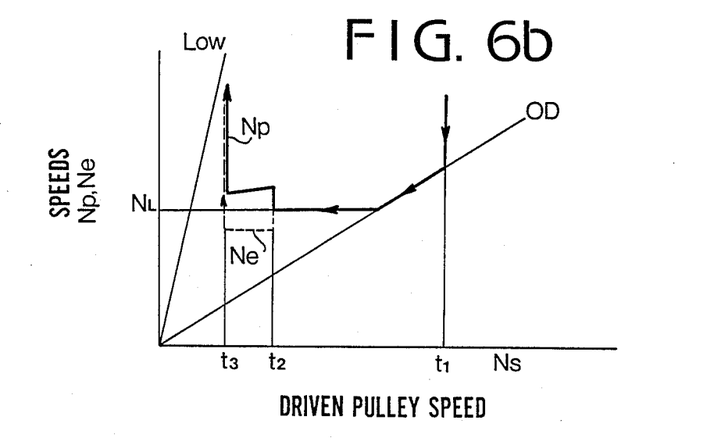

Referring to FIGS. 6a and 6b, when the accelerator pedal is released at a time $t_1$ of FIG. 6a, the desired transmission ratio id is reduced to reduce the actual transmission ratio i for the purpose of overdriving. Thereafter, the transmission is downshifted as the vehicle speed reduces. When the vehicle speed reduces below a set value (20 km/h) at a time t2, the clutch 2 is disengaged and the current becomes zero by the supply section 123.

At that time, the desired transmission ratio id is increased to id$+\Delta$id at the correcting section in accordance with the signal from the supply section 123, so that the actual transmission ratio is also increased as shown in FIG. 6a by lines i and id. In addition, the transmission ratio changing speed di/dt is also increased, thereby rapidly downshifting the transmission. Thus the drive pulley speed $N_P$ increases as shown by lines $N_P$ of FIGS. 6a and 6b.

When the accelerator pedal is depressed at a time $t_3$, the supply section 123 produces an engagement signal. In response to the engagement signal, the driver 124 operates to engage the clutch 2. Since the drive pulley speed is increased, the clutch can be smoothly engaged.

In accordance with the second embodiment, the transmission is downshifted immediately after the disengagement of the clutch. Accordingly, at the time when the accelerator pedal is depressed, the drive pulley speed has been increased up to a high speed, so that the clutch can be smoothly engaged without delay.

In the second embodiment, correcting quantity $\Delta$id is constant. Accordingly, the drive pulley speed $N_P$ decreases with decrease of the vehicle speed as shown in FIGS. 6a and 6b between $t_2$ and $t_3$. As a result, increase of the drive pulley speed is delayed.

Figure 7:
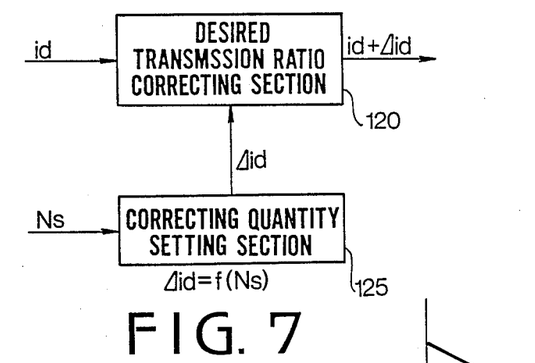
FIG. 7 is a block diagram of a third embodiment of the invention.
Figures 8A, 8B:
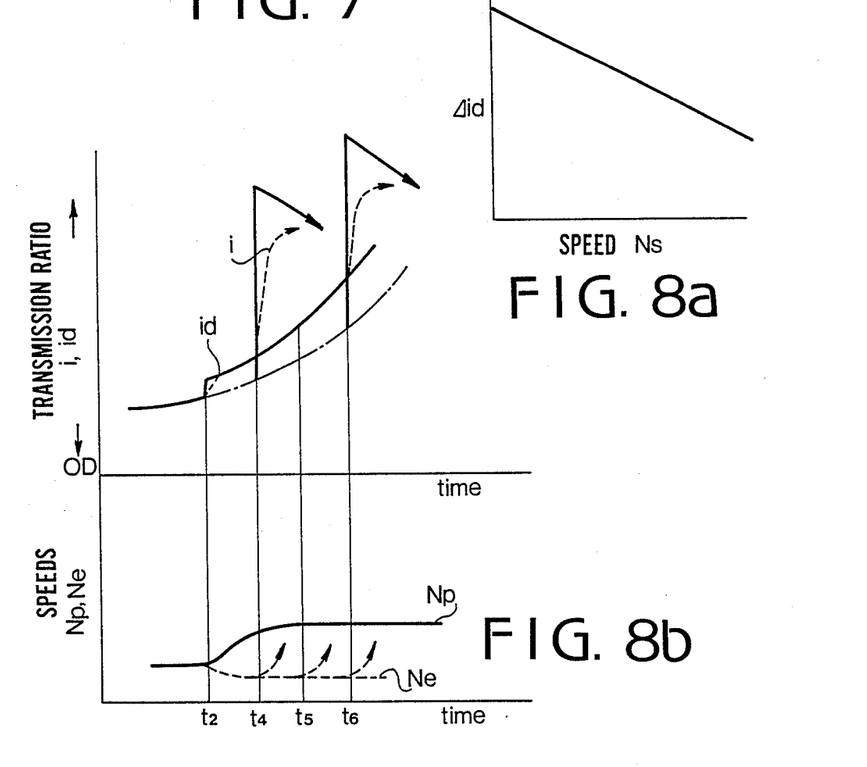
FIG. 8a is a graph showing variation of correcting quantity.
FIG. 8b is a graph showing operation of the system of FIG. 7.

The third embodiment of FIG. 7 eliminates such a disadvantage. The system is provided with a correcting quantity setting section 125. The section 125 produces a correcting quantity $\Delta$id in accordance with a function of $N_S$ driven pulley speed $f(N_S)$. The quantity $\Delta$id is a decreasing function of $N_S$ as shown in FIG. 8a. The correcting quantity $\Delta$id is fed to the desired transmission ratio correcting section 120, thereby increasing the desired transmission ratio (id$+\Delta$id) with decrease of vehicle speed as shown in FIG. 8b. Accordingly, the drive pulley speed $N_P$ is held substantially constant. Therefore, if the vehicle is re-accelerated at any one of times $t_4$, $t_5$ and $t_6$, the clutch can be smoothly engaged.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting power of an internal combustion engine to driving wheels of a motor vehicle through a clutch, the transmission having a drive pulley including a hydraulically shiftable first disc and a first hydraulic cylinder for shifting said first disc, a driven pulley including a hydraulically shiftable second disc and a second hydraulic cylinder for shifting said second disc, and a belt engaged with both pulleys, the control system comprising a transmission ratio control valve having ports and a spool, a first hydraulic circuit having a pump for supplying oil to said first hydraulic cylinder through said transmission ratio control valve and to said second hydraulic cylinder, a second hydraulic circuit for supplying control oil to said spool of said transmission ratio control valve to control the latter, solenoid operated on-off control valve means provided in said second hydraulic circuit for controlling amount of the control oil supplied to said spool, first sensor means for producing a vehicle speed for signal dependent on vehicle speed, first means responsive to the vehicle speed signal at a predetermined low vehicle speed producing a clutch disengaging signal for disengaging the clutch, second sensor means for detecting position of a throttle valve of said engine and for producing a throttle position signal dependent on said position, second means responsive to said throttle position signal for producing a desired transmission ratio signal, third means for determining an actual transmission ratio of the transmission, fourth means responsive to said actual transmission ratio and said desired transmission ratio signal for determining rate of change of the transmission ratio, driving means for driving said solenoid operated on-off control valve means corresponding to said rate of change of the transmission ratio for shifting said spool of said transmission ratio control valve, the improvement in the control system comprising:

re-acceleration detector means responsive to said vehicle speed signal and to said throttle position signal for detecting opening of said throttle valve to re-accelerate the vehicle at a vehicle speed lower than said predetermined low vehicle speed for producing a re-acceleration signal;

said fourth means including fifth means responsive to said re-acceleration signal for increasing the rate of change of the transmission ratio such that a present speed of the drive pulley positively increases.

2. The system according to claim 1, further comprising engine acceleration detecting means for producing an engine acceleration signal dependent on acceleration of the engine, the fifth means being responsive to the engine acceleration signal for increasing said rate of change of the transmission ratio dependent of the acceleration of the engine.

3. The system according to claim 1, wherein said fifth means rapidly increases the rate of change of the transmission ratio and the transmission ratio responsive to said re-acceleration signal.

4. The system according to claim 1, further comprising
means for partially engaging said clutch as engine speed increases upon the re-acceleration of the vehicle, and
means for locking-up said clutch when the speed of said drive pulley equals speed of the engine after said increasing of the rate of change of the transmission ratio.

5. The system according to claim 1, further comprising
means for increasing the rate of change of the transmission ratio responsive to said clutch disengaging signal.

6. In a control system for a continuously variable transmission connected to driving wheels of a vehicle having an engine and an electromagnetic clutch for selectively transmitting the power of the engine to the continuously variable transmission, the control system comprising a transmission ratio control valve means for producing hydraulic control pressure responsive to driving conditions, the transmission comprising drive pulley means for controlling the transmission ratio of the transmission responsive to the hydraulic control pressure supplied from the transmission ratio control valve means, driven pulley means, and a belt engaging said drive and driven pulley means, the control system including an engine speed sensor for sensing engine speed and for producing an engine speed signal, sensing means for sensing position of a throttle valve provided in the engine and for producing a throttle position signal responsive to opening degree of the throttle valve, a drive pulley speed sensor for sensing rotational speed of the drive pulley means and for producing a drive pulley speed signal, a driven pulley speed sensor for sensing rotational speed of the driven pulley means and for producing a driven pulley speed signal, means for disengaging said clutch under a predetermined value of the driven pulley speed, and drive range detecting means for detecting a drive mode of the transmission and for producing a drive mode signal in a drive condition of the transmission, the improvement in the control system comprising:
an actual transmission ratio calculator for producing an actual transmission ratio signal dependent on the ratio of the drive and driven pulley speed signals,
desired transmission ratio means including a table for determining a desired transmission ratio signal in response to the driven pulley speed and throttle position signals,
transmission ratio changing rate means responsive to said actual and desired transmission ratio signals for producing a transmission ratio changing rate signal,
engine acceleration detecting means responsive to the engine speed signal for detecting acceleration of the engine for producing an engine acceleration signal dependent on the acceleration,
re-acceleration detecting means responsive to the drive mode signal, the driven pulley speed signal and the throttle position signal for producing a re-acceleration signal when the throttle valve is open to re-accelerate the vehicle and the driven pulley speed is under said predetermined value at which said clutch is disengaged,
correcting means responsive to the engine acceleration signal and the re-acceleration signal for correcting the transmission ratio changing rate signal for controlling the transmission ratio control valve means so as to increase downshifting rate of change of the transmission ratio, so as to increase the drive pulley speed to prevent shock of the clutch upon the re-acceleration of the engine and engagement of the clutch.

7. The system according to claim 6, further comprising
speed calculator means responsive to said throttle position signal for determining rate of opening of the throttle valve,
coefficient setting means for providing a coefficient dependent on the rate of opening of the throttle valve, and
said transmission ratio changing rate means being further responsive to said coefficient setting means for producing said transmission ratio changing rate signal dependent on said coefficient.

8. A control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including hydraulically shiftable disc and a second hydraulic cylinder for shifting the disc, a belt engaged with both pulleys, a transmission ratio control valve having ports and a spool, a first hydraulic circuit having a pump for supplying oil to the first and second cylinders through the transmission ratio control valve, a second hydraulic circuit for supplying a part of the oil to both ends of the spool of the transmission ratio control valve, solenoid operated on-off control valve means provided in the second hydraulic circuit for controlling amount of oil supplied to the ends of the spool,
sensor means for detecting load on the engine and for producing a load signal, first means responsive to the load signal for producing a desired transmission ratio signal,
second means responsive to the desired transmission ratio signal for deciding a duty ratio of electric pulses, driving means for driving the solenoid operated on-off control valve means at the decided duty ratio and for shifting the spool of the transmission ratio control valve so as to provide a transmission ratio, the system comprising:
third means for detecting disengagement of the clutch at vehicle speed lower than a predetermined value and for producing a disengagement signal;
fourth means for positively increasing the desired transmission ratio and drive pulley speed under the condition of existence of the disengagement signal.

9. In a control system for a continuously variable transmission for transmitting power of an internal combustion engine to driving wheels of a motor vehicle through a clutch between the transmission and the engine, with an accelerator pedal controlling the engine, the improvement in the control system comprising
means for producing a disengagement signal during a condition of disengagement of the clutch at vehicle speed lower than a predetermined value when the accelerator pedal of the engine is in a released state during driving of the vehicle; and
means for positively increasing both the transmission ratio of the transmission and drive pulley speed in response to the presence the disengagement signal upon stepping down on the accelerator pedal.

10. A method for control of a continuously variable belt-pulley transmission in a vehicle having an engine and a clutch connected between the engine and a drive pulley of the transmission, and an accelerator pedal controlling the engine, comprising the steps of
disengaging the clutch when, the accelerator pedal of the engine is in a released state during driving of the vehicle, vehicle speed goes below a predetermined value, and
continuously increasing the transmission ratio of the transmission while keeping the speed of the drive pulley substantially constant with the drive pulley speed being substantially higher than engine idling speed, as the vehicle speed goes from a speed above to a speed below said predetermined value and as the vehicle speed continues reducing below said predetermined value when the clutch is disengaged when the accelerator pedal of the engine is in a released state during driving of the vehicle.

11. The control method according to claim 10, further comprising the steps of
from said step of continuously increasing, rapidly increasing the transmission ratio such that the speed of the drive pulley positively increases upon stepping down on the accelerator pedal, and
engaging the clutch with the drive pulley when the speed of the engine has increased to substantially that of the drive pulley by said stepping down on the accelerator pedal.

12. A method for control of a continuously variable belt-pulley transmission in a vehicle having an engine, an accelerator pedal controlling the engine, and a clutch connected between the engine and a drive pulley of the transmission, comprising the steps of
disengaging the clutch when, during driving of the vehicle with the accelerator pedal released, vehicle speed goes below a predetermined value,
increasing the transmission ratio such that the speed of the drive pulley positively increases, upon stepping down on the accelerator pedal prior to clutch re-engagement from said clutch disengaged condition.

13. The control method according to claim 12, further comprising the step of
re-engaging the clutch as engine speed increases when the engine speed reaches the drive pulley speed.

14. The control method according to claim 12, wherein the step of increasing the transmission ratio has a rate of change of the transmission ratio dependent on the magnitude of accelerating the engine in response to said stepping down on the accelerator pedal.

15. The control method according to claim 12, wherein
said transmission has a maximum transmission ratio during acceleration at low vehicle speed,
and further comprising the step of increasing the transmission ratio to said maximum transmission ratio immediately upon the stepping down on the accelerator pedal.

16. The control method according to claim 15, further comprising the steps of
re-engaging the clutch as engine speed increases when the engine speed reaches the drive pulley speed,
partially engaging said clutch prior to said re-engaging step as engine speed increases after the stepping down on the accelerator pedal, and
increasing the drive pulley speed at said maximum transmission ratio as said clutch is partially engaged prior to said re-engaging step.

17. The control method according to claim 13 further comprising the steps of
keeping said clutch in a partially engaged state from a time prior to and up until the engine speed initially reaches said drive pulley speed, and thereafter immediately completely engaging said clutch.

* * * * *